United States Patent [19]
Krummheuer et al.

[11] Patent Number: 5,612,124
[45] Date of Patent: Mar. 18, 1997

[54] FABRICS OF HIGH THERMAL STABILITY

[75] Inventors: Wolf R. Krummheuer, Wupperatl; Volker Siejak, Duisburg, both of Germany

[73] Assignee: Akzo Nobel NV, Arnhem, Netherlands

[21] Appl. No.: 291,656

[22] Filed: Aug. 17, 1994

[30] Foreign Application Priority Data

Mar. 25, 1992 [DE] Germany ........................... 42 09 628.6
Feb. 5, 1993 [DE] Germany ........................... 43 03 345.8

[51] Int. Cl.$^6$ .................................................... D03D 3/00
[52] U.S. Cl. ........................................ 442/181; 280/728.1
[58] Field of Search ................ 280/728 R; 428/229, 428/225

[56] References Cited

U.S. PATENT DOCUMENTS

| | | | |
|---|---|---|---|
| 3,814,458 | 6/1974 | Acs | 280/150 |
| 3,842,583 | 10/1974 | Gage | 57/140 |
| 4,840,397 | 6/1989 | Katz et al. | 280/739 |
| 4,840,838 | 6/1989 | Wyss | 428/234 |
| 4,921,735 | 5/1990 | Bloch | 428/34.9 |
| 5,093,163 | 3/1992 | Krummheuer et al. | 428/35.1 |
| 5,178,408 | 1/1993 | Barrenscheen et al. | 280/728 |
| 5,213,363 | 5/1993 | Fukumori et al. | 280/743 |
| 5,356,680 | 10/1994 | Krummheuer et al. | 428/36.1 |

FOREIGN PATENT DOCUMENTS

| | | | |
|---|---|---|---|
| 2034067 | 7/1991 | Canada . | |
| 0442373 | 8/1991 | European Pat. Off. . | |
| 2159449 | 6/1973 | Germany . | |
| 4009611 | 2/1991 | Germany . | |
| 6441438 | 2/1989 | Japan . | |
| 1104848 | 4/1989 | Japan . | |
| 4194048 | 7/1992 | Japan . | |
| 4-194048 | 7/1992 | Japan | D03D 1/02 |

*Primary Examiner*—James J. Bell
*Attorney, Agent, or Firm*—Joseph M. Noto; Louis A. Morris

[57] ABSTRACT

Uncoated fabrics for the production of airbags, particularly said airbags. There fabrics are thermally stable and set to a specific air permeability via the linear density-dependent choice of the numbers of threads and via a relaxation in a wet process. The fabric is constructed of yarns of polytetramethyleneadipamide having a yarn linear density of 200–500 dtex and a filament linear density <7 dtex. The fabrics produced have an air permeability <100 l/dm$^2$xmin. They offer security against thermal failure when used in manufacturing airbags.

9 Claims, 1 Drawing Sheet

FABRICS OF HIGH THERMAL STABILITY

BACKGROUND OF THE INVENTION

1. Field of the Invention

The invention relates to technical woven fabrics of high thermal stability which have an air permeability set to a specific value via the linear density-dependent choice of the numbers of threads and via a relaxation in a wet process and for a side airbag manufactured from this fabric.

2. Description of the Prior Art

Technical fabrics for some applications are required to possess not only a specific air permeability but also in particular good heat resistance. This is true, for example, of fabrics for hot gas filtration and in particular for airbag fabrics, especially for side airbags, installed at the side of the vehicle such as in a door or seat.

The woven fabrics used for airbags have to meet a number of very important requirements. Hitherto airbags were mainly manufactured using coated fabrics of very low air permeability. Lately, airbag manufacturers are increasingly using uncoated fabrics. With these fabrics the air permeability is an especially important property. In the contact part of the airbag, i.e. the part towards which the generator-produced gas flows in the event of the airbag function being deployed, it should be very low at <10 l/dm$^2$xmin. However, in order that the gas can slowly escape again in a controlled fashion, the side parts of the airbag have to be more air-permeable. These filter portions of the fabric are required to have air permeabilities between 40 and 100 l/dm$^2$xmin, depending on the vehicle type. This kind of airbag, consisting of two fabrics with different air permeabilities, is required for driver airbags and for passenger airbags which are, when expanded, in front of the car driver and the passenger.

In recent times a further type of airbag has become more and more the focus of attention. This is the side airbag typically installed in the door of the car or in the seat. This airbag is expanded in the case of a collision at the side of the vehicle and protects the driver or the passenger against injuries inflicted by the side of the car and penetrating metal elements. Side airbags are manufactured of only one kind of fabric with a low air permeability of <20 l/dm$^2$.min, preferred <10 l/dm$^2$.min.

As well as the aforementioned, specific air permeability, airbag fabrics are required to have good foldability and a low fabric thickness to minimize the space required when the airbag is accommodated in the vehicle, for example inside the steering wheel. To ensure optimum functioning of the airbag system, the mass of fabric should be as low as possible. A low fabric mass is especially beneficial in the event of out-of-position accidents, when the driver or front seat passenger is not in his or her normal seated position at the time of the collision. The momentum of impact of the explosively expanding airbag on the vehicle occupant decreases with decreasing fabric mass and hence a lower fabric mass makes possible softer cushioning of the vehicle occupant by the airbag. A further requirement is that the airbag fabric should have a high strength, which should be the same in both directions of the weave.

The special problem with airbags, particularly side airbags, is thermal failure of the fabric. By this is meant the softened or fully molten areas of the fabric through which the gas in the airbag can escape uncontrollably and which may make possible the emergence into the passenger compartment of glowing particles which may cause burn injuries to the vehicle occupants. These hot and glowing particles are formed in the course of the explosive ignition of the gas generator. The gas carries the particles into the airbag where they can soften or burn through individual areas of the airbag fabric.

A particular problem area of the driver and passenger airbag manufactured of two fabrics sewn together is the seam region of the airbag. Owing to the stresses which these areas are subjected to in the course of the expansion of the airbag, there is a danger that hot gases will increasingly flow through the needle holes and thus subject the airbag fabric to particular thermal stresses in these locations.

To solve this problem DE-A-21 59 449 proposes absorbing the heat by coating the inner surface of the airbag with a film or by introducing a liner into the airbag. As well as the much higher manufacturing costs of this process, airbags of this kind have the serious disadvantage of needing more space on account of the greatly increased fabric thickness due to the coating with a film or an appropriate liner, and hence of a high packing volume. In addition, closely packed films—unavoidable in the storage of the folded airbag in the steering wheel of a vehicle—tend to bond. Bonding can be controlled by sprinkling with talcum powder. In the event of the airbag function being deployed this powder then leads to a dense fog in the passenger compartment, since it passes into said compartment together with the gas escaping from the airbag. This represents not only an appreciable general nuisance to the vehicle occupants but also greatly impairs their vision.

U.S. Pat. No. 3,814,458 proposes improving the absorption of heat with an aluminized neoprene coating. This is likewise subject to the aforementioned disadvantages such as high airbag manufacturing costs, the great deal of space required for accommodating the airbag in the vehicle and an appreciable nuisance to the vehicle occupants in the event of the airbag function being deployed owing to the talcum powder required for sprinkling on the coating.

DE-C-36 44 554 proposes sewing a filter fabric of aromatic polyamide fibers into the airbag. This type of fiber has good thermal stability and thus offers adequate protection against thermal failure of the fabric. However, protection against glowing particles is produced only in respect of the area of the filter fabric, which is comparatively small compared with the total area of the airbag. The other fabric parts of the airbag are left unprotected. A further disadvantage of the airbags of the embodiment proposed are the high manufacturing costs and a multimaterial system which complicates recycling.

Airbag fabrics are normally manufactured using polyester or polyamide fibers. The former fibers are customarily based on polyethylene terephthalate, whilst the latter fibers based on polyamide-6.6 (polyhexamethyleneadipamide) are preferred. Neither polyester nor polyamide-6.6 fibers ensure adequate prevention of particle burn-through. For this reason it has been considered to manufacture airbag fabrics from fibers of higher thermal resistance. However, fabrics made from these fibers do not meet all the requirements of uncoated airbag fabrics such as high strength and suitable shrinkage properties which are necessary for manufacturing an uncoated, dense woven fabric of low air permeability in order that additional costly finishing operations may be dispensed with. Moreover, high temperature resistant fibers have the disadvantage of a very high raw material price.

JP-A-01/104 848 and JP-A-64/041 438 mention, in addition to a large number of polymers for synthetic fibers suitable for manufacturing coated airbag fabrics, polymers which result in fibers of high thermal stability. However, neither of these cited patent publications provides any indication as to how an uncoated airbag fabric of good thermal stability is to be manufactured. JP-A 01 - 041 438 only discloses coated fabrics. In JP 01 - 104 848 ('848) coated and uncoated fabrics are disclosed. To obtain fabrics with a low air permeability, '848 requires coating. The air permeability of the uncoated fabric of Embodiments of '848 is calculated to be 62 l/dm².min under a test differential pressure of 500 Pa. This is the lowest air permeability obtained with uncoated fabrics taught by '848. To obtain an air permeability as e.g. required for side airbags, '848 requires coating (see comparison example No. 3) in which the air permeability achieved is calculated to be <5 l/dm².min).

It is, therefore, the object of the present invention to make available a technical woven fabric which has a specifically set air permeability, which is uncoated and which meets all the other requirements of woven fabrics of this kind such as, for example, high strength and good foldability and which, moreover, offers good protection against thermal failure on account of an adequate heat capacity and which can be produced at approximately the same manufacturing costs as the previously employed fabrics made of polyamide 6.6 or polyester yarns. Moreover, this object is to be achieved with a recyclable single-material system.

It has now been found, surprisingly, that this object is achieved when the fiber material used is polytetramethyleneadipamide (nylon 4.6) which has a unique suitability for use in fabrics for airbag construction, especially for side airbags. There has been a long felt but unsolved need for an uncoated fabric to replace coated fabric and still have the necessary thermal stability and protection against thermal failure, strength, low air permeability and foldability. The present invention fulfills that need.

SUMMARY OF THE INVENTION

In brief summary, the present invention is an uncoated fabric for the production of an airbag, especially a side airbag with a high thermal stability and protection against thermal failure, comprising multifilament yarns of polytetramethyleneadipamide, said yarns having a yarn linear density of 200–500 dtex and a filament linear density <7 dtex, a tenacity of at least 60 cN/tex and a breaking extension of 15–30% and said fabric having an air permeability <100 l/dm²xmin, preferably <60 l/dm².min.

DESCRIPTION OF THE INVENTION

Fibers made of polytetramethyleneadipamide are known. They form part of the group of the aliphatic polyamide fibers. This type of fiber is sometimes also designated nylon-4.6. They are, like the other aliphatic polyamide fibers, spun by known melt spinning techniques. Where reference is made in what follows to polytetramethyleneadipamide fibers, this is to be understood as meaning not only fibers made of 100% of this polymer but also fibers made of copolymers mainly comprising polytetramethyleneadipamide.

As regards fiber properties such as strength, extension and shrinkage, these fibers differ only insignificantly from the polyamide-6.6 (polyhexamethyleneadipamide) fibers hitherto very frequently used for airbag fabrics. However, their particular advantage is a melting point of about 290° C. By comparison the melting point of polyester (polyethyleneterephthalate) fibers and of polyamide-6.6 (polyhexamethyleneadipamide) fibers is about 255° C. The high thermal stability confers effective protection against thermal failure on airbags manufactured from fabrics made of polytetramethyleneadipamide yarns.

The polytetramethyleneadipamide yarns used for manufacturing technical fabrics according to the invention have a yarn linear density of 200–500 dtex and a filament linear density of below 7 dtex. In the case of side airbags, higher yarn linear densities of up to 750 dtex, e.g., 700 dtex, are suitable. Preference is given to yarns of 235, 350 or 470 dtex. The number of filaments is for example 36 in the case of the yarn of 235 dtex, which corresponds to a filament linear density of 6.5 dtex. A yarn with a yarn linear density of 470 dtex is for example made up of 72 filaments, which likewise corresponds to a filament linear density of 6.5 dtex. A yarn of 350 dtex usually has 72 filaments. Consequently its filament linear density is 4.9 dtex. Further suitable yarns have a yarn linear density of 235 dtex made up of 72 filaments, which corresponds to a filament linear density of 3.3 dtex, a yarn linear density of 350 dtex made of 94 filaments, which corresponds to a filament linear density of 3.7 dtex, or a yarn linear density of 470 dtex made up of 104 filaments, which corresponds to a filament linear density of 4.5 dtex. Using a yarn with a linear density of 700 dtex, e.g., for the manufacture of side airbags, the number of filaments will be 140, corresponding to a filament linear density of 5.0 dtex.

The choice of yarn and filament linear density depends on the desired properties of the woven fabric. For instance, relatively high linear densities result in high strength, while relatively low linear densities result in the particular advantage of low fabric thickness and of good fabric foldability.

Suitable yarns have a tenacity of at least 60 cN/tex and a breaking extension of 15–30%. The shrinkage data are set with the intended application in mind. Fabrics which are required to have a very low air permeability, such as contact fabrics for airbags (where the required air permeability is 10 l/dm²xmin), or fabrics for side airbags where the required air permeability is <20 l/dm².min and preferably <10 l/dm²min, are made for example using yarns having a hot air shrinkage of 7–10% (measured at 190° C). In the case of filter fabrics for airbags the desired air permeabilities are 40–100 l/dm²xmin. Suitable yarns for manufacturing these fabrics have for example hot air shrinkage values of 2–4% (measured at 190° C).

The fabric density depends on the desired air permeability and is settable by the numbers of threads of yarn per unit of linear dimension (length and/or width). The numbers of threads have to be chosen as a function of the yarn linear density. For instance, if the yarn has a linear density of 235 dtex, the numbers of threads will be 26–30/cm, if the yarn has a linear density of 350 dtex, the numbers of threads will be 18–28/cm, and if the yarn has a linear density of 470 dtex, the numbers of threads will be 18–25/cm.

The weave is preferably a plain weave. If a relatively fine yarn is used it is also possible, in the interests of an attractive fabric handle, to use a 2/2 panama weave. In the case of fabrics which are to possess a relatively high air permeability it can also be advantageous to employ weaves other than a plain weave which lead to an improvement in the seam slip resistance. Examples are cross twill or panama constructions.

For fabrics for side airbags, a panama weave is preferred. Using a yarn with a linear density of 470 dtex, the number of threads will be in the case of a panama weave 22–27/cm. With a higher yarn linear density of 700 dtex, it is possible to weave in a plain weave construction. In this case, the number of threads will be 15–19/cm. For instance, to make a fabric with a weight of about 275 g/m² by using a yarn with a linear density of 470 dtex and weaving in a panama weave 24.5 threads/cm in warp and weft are necessary. Manufacturing a fabric with the same weight but by using yarns with a linear density of 700 dtex and weaving in plain weave, the number of threads will be 17/cm in warp and weft.

For fabrics for side airbags a particularly high thermal stability is required. Therefore, it is necessary to manufacture fabrics with a high density. As a measure of the density of the fabric, the weight of the fabric in g/m² is normally used. For fabrics for side airbags produced of polytetramethyleneadipamide yarns, a weight of 220–320 g/m², preferred 240–290 g/m², is required.

The fabric sett should be square, i.e. the ends and picks per cm should be essentially the same. The square sett of the fabric makes it simple to meet the demand for equal strength in warp and weft. This demand is voiced in particular by automotive manufacturers in relation to airbags, since an airbag is a radially symmetrical component without preferred direction.

The weaving of fabrics can take place on customary weaving machines, provided they allow the employment of relatively high numbers of threads. Of particular suitability for this purpose are gripper looms.

The fabrics thus produced are subjected to a wet treatment for shrinking the fabric in an aqueous bath at treatment temperatures between 60° and 140° C. Particular preference is given to the temperature range 90°–95° C. The beginning temperature is 40°–60° C. and the temperature is increased during the treatment to the chosen temperature, normally 90°–95° C. The treatment is suitably carried out on a jigger. This machine is well known to persons skilled in the art. Other machines customary in the textile finishing industry as e.g. open-width washing machines can also be used.

The treatment time to be chosen for the wet process and any additives are dependent on some different aspects as the kind and the amount of finishing agents on the fabric, the kind of machine etc. and are known to the person skilled in the art.

Drying takes place at 130°–170° C., preferably at 140°–160° C. However, higher temperatures of up to 190° C. are also possible. A suitable drying-machine is for example a stenter.

The resulting polytetramethyleneadipamide fabrics meet all the requirements of airbag fabrics and of hot gas filter fabrics.

Figure 1:
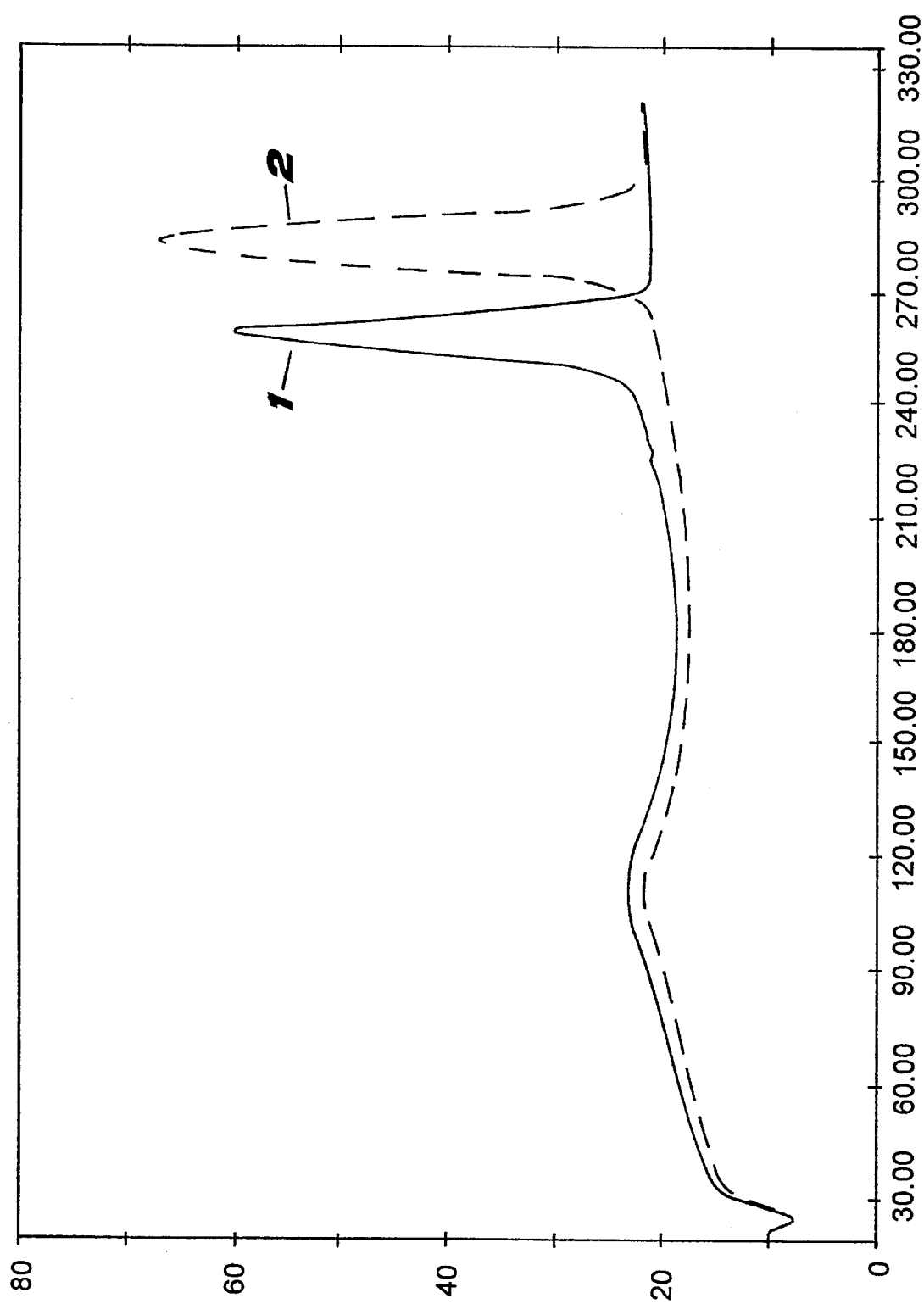
FIG. 1 shows the differential scanning calorimetry (DSC) curve of polytetramethyleneadipamide(polyamide-4.6) compared with polyhexamethyleneadipamide (polyamide-6.6). The abscissa is the temperature in ° C. The ordinate shows the heat flux in mW (milliwatts). The heating-up rate in this test was 40° C. per minute. Curve 1 shows the thermal response of polyamide-6.6 (polyhexamethyleneadipamide) and curve 2 that of polyamide-4.6 (polytetramethyleneadipamide). As the two polymers heat up, the curves are largely the same. Consequently, the curves for the specific heat $C_p(T)$ should also be virtually the same. It follows that polytetramethyleneadipamide, with its higher melting point compared with polyhexamethyleneadipamide, will bring about a distinct improvement in the thermal stability, since significantly more thermal energy is required to heat polytetramethyleneadipamide from the ambient temperature to the melting point than for polyhexamethyleneadipamide.

The advantage of polytetramethyleneadipamide (polyamide 4.6) can also be demonstrated by comparing the thermal properties of other often used polyamides as polyhexamethyleneadipamide (polyamide 6.6) and polycaprolactam (polyamide 6). Normally, a difference in enthalpy dependent on the difference in melting point is expected. But in comparing these differences, the polytetramethyleneadipamide requires a surprisingly higher enthalpy than expected. This is demonstrated by the following table:

|  | PA 6 |  | PA 6.6 |  | PA 4.6 |
|---|---|---|---|---|---|
| Melting point °C. | 216 |  | 258 |  | 283 |
| Difference in melting points (% of higher value) |  | 16.3 |  | 8.8 |  |
| Enthalpy J/g | 507 |  | 620 |  | 771 |
| Difference in enthalpy (% of higher value) |  | 18.2 |  | 19.6 |  |

Comparing polyamide 6 and polyamide 6.6, about the same difference in melting points and enthalpy exists. But comparing polyamide 6.6 normally used for manufacturing airbags with polyamide 4.6, a surprisingly much higher percentage difference in enthalpy, as compared to melting point, is ascertained. This means that not only the higher melting point of polytetramethyleneadipamide (polyamide 4.6) contributed to the required high thermal stability but also to an even greater extent, proportionally, the surprisingly higher enthalpy. For melting polytetramethyleneadipamide, about twice the enthalpy as expected is required. The greater than expected thermal energy needed to melt polytetramethyleneadipamide provides a supplementary thermal protection.

The enthalpy needed for melting polytetramethyleneadipamide is in the range of 720–820 J/g (Joule per gram). This is the enthalpy necessary for heating the material at a constant pressure from 20° C. to the melting point. The normal method of measurement is the DSC, well known in the art. DSC means Differential Scanning Calorimetry. Joule is in accordance with the SI-system, a measure for the quantity of heat 0.1 Joule corresponds 0.239 cal.

In this case the following formula is used to determine enthalpy::

$$\text{Enthalpy} = \int_{20°\text{C.}}^{Ts} Cp(T)\ dT$$

Cp(T) means the quantity of heat. dT means integration over the temperature range.

Fabrics made of polytetramethyleneadipamide yarns thus offer in particular excellent protection against thermal failure, as is indeed confirmed by comparative tests on the inflation of airbags made of polytetramethyleneadipamide fibers, polyamide-6.6 (polyhexamethyleneadipamide) fibers and polyester fibers. For a given combination of gas generator and fabric construction, fabrics made of polyhexamethyleneadipamide yarns show in a function test distinct signs of function-endangering thermal stress at a module and fabric temperature of 85° C. (module here means the housing for accommodating the airbag). The same is true of fabrics made of polyester fibers. In contradistinction thereto, fabrics made of Polytetramethyleneadipamide yarns show no noticeable signs of thermal stress in this test.

It has similarly been found that owing to the better thermal stability hot gas filtration fabrics made of polytetramethyleneadipamide fibers permit a longer use time than fabrics made of conventional fibers.

A particular advantage of fabrics made of polytetramethyleneadipamide fibers results from the fact that the high thermal capacity of these fabrics makes it possible to reduce their mass by reducing the yarn linear density or by using lower numbers of threads in making the fabric. This shows itself not in lower production costs but also in increased safety in cushioning a vehicle occupant in the event of a collision. The reduced mass of the airbag fabrics made of polytetramethyleneadipamide fibers leads on the one hand to less space being required to stow away the airbag, for example in the steering wheel of a motor vehicle, but on the other also in safer cushioning of the vehicle occupants by the airbag in the event of a collision. The momentum of impact of the airbag on the vehicle occupants due to the explosive inflation of the airbag is reduced by a lower fabric mass, which manifests itself in particular as softer cushioning when the driver or front seat passenger is out of position.

A further particular advantage of fabrics manufactured by using polytetramethyleneadipamide fibers is their good aptitude for side airbags. Side airbags have recently become more and more important. As a result of investigations of accidents, little protection of the driver or the passenger of a car by a normal airbag has been found when a collision takes place by a car penetrating into the side part of a vehicle. In this case, injuries of the driver or the passenger can occur by parts of the car door or by parts of the collision vehicle. Therefore, the car manufacturer must try to protect the driver and the passenger of a car by supplemental side airbags.

The side airbag is normally installed in the car door or in the seat. The inflating of the side airbag is induced by the action of sensors installed in the side parts of the car or in the car door. In the case of a collision occurring by a car coming towards the front part of vehicle, there is a kind of buffer zone, e.g., by the motor compartment. But this buffer does not exist in the case of an accident by a car coming towards the side part of the vehicle. Therefore, different inflation means for the side airbags are required as for the normal front airbags. A driver or passenger airbag is inflated in about 60 msec. A side airbag must be inflated in about 10–15 msec.

To guarantee this very short time of inflation side airbag generators producing a very hot gas must be used. Therefore, the requirements for thermal stability are higher for side airbags than for normal airbags.

In view of the requirements of high thermal stability, coated fabrics have been used for side airbags with the fabric of choice, at least recently, being manufactured of polyamide 6.6 yarn. In principle, it is possible to use uncoated fabrics of polyamide 6.6 yarns, but these fabrics must be manufactured in a very high density. Besides the technical problems in weaving very dense fabrics, the costs for these fabrics are very high and they do not satisfy required good foldability requirements.

It has been experimentally demonstrated that uncoated fabrics for airbags of polyhexamethyleneadipamide (polyamide 6.6) yarns must have a weight of at least 340 g/m$^2$. Using polytetramethyleneadipamide (polyamide 4.6) yarns, the same protection against thermal failure can be obtained by a fabric with a weight of 275 g/m$^2$. This comparison demonstrates that by using polytetramethyleneadipamide yarns with much lighter fabrics the same effect is attained. These lighter fabrics have further advantages concerning the processing properties during weaving, the costs for the fabrics and particularly the foldability. This means that only by using polytetramethyleneadipamide yarns satisfactory uncoated fabrics for side airbags can be produced.

The above observations show that airbags made of polytetramethyleneadipamide fibers offer enhanced safety for the vehicle occupants as regards safer cushioning in the event of a collision, since the gas which has flown into the airbag cannot escape in an uncontrolled and unfiltered fashion and no hot particles can cause injuries to the vehicle occupants. Further, polytetramethyleneadipamide fibers are particularly advantageous for the manufacturing of fabrics for side airbags, because only those fibers enable the manufacturer of uncoated fabrics for side airbags with a good protection against thermal failure, low costs and good foldability. An airbag system containing an airbag manufactured from polytetramethyleneadipamide yarns thus offers over existing systems the appreciable advantage of higher safety of the vehicle occupants. An airbag system is to be understood as meaning the airbag itself, the housing for the airbag in the motor vehicle and the control system for deploying the airbag function.

OPERATIVE EXAMPLE 1

A 235 dtex 36 filament polytetramethyleneadipamide yarn, the filament linear density being accordingly 6.5 dtex, was plain-woven to form an airbag contact fabric. Nominal picks and ends were both 30/cm. The yarn used had a hot air shrinkage of 7.8% (measured at 190° C.).

The fabric was subjected to a wet treatment on a jigger at 95° C. and then dried at 150° C. The drying time was 30 sec.

The air permeability of the fabric thus produced was 6.9 l/dm$^2$×min under a test differential pressure of 500 Pa.

COMPARATIVE EXAMPLE 1

In contradistinction to Example 1, a conventional filament yarn composed of polyamide-6.6 (polyhexamethyleneadipamide) was used for manufacturing an airbag fabric. The yarn linear density was likewise 235 dtex and the number of filaments was likewise 36. These yarns were plain-woven into an airbag contact fabric with nominal ends and picks per cm both 30. The hot air shrinkage of the yarn used was 7.4% (measured at 190° C.).

The treatment of the yarn was similar to that described in Example 1.

The fabric obtained had an air permeability of 7.4 l/dm$^2$×min.

As the table below shows, the fabric data showed no significant differences between the fabrics produced from polytetramethyleneadipamide yarns and the fabrics produced from polyhexamethyleneadipamide yarns.

| Polymer | Example 1 Polytetra- methylene- adipamide | Comparative Example 1 Polyhexa- methylene- adipamide |
| --- | --- | --- |
| Numbers of threads/cm | | |
| Warp | 30.2 | 30.8 |
| Weft | 30.7 | 29.1 |
| Basis weight g/m$^2$ | 166.3 | 165.7 |
| Fabric thickness mm | 0.262 | 0.258 |
| Breaking strength N | | |
| Warp | 2050 | 2075 |
| Weft | 2070 | 1945 |

| Polymer | Example 1 Polytetra- methylene- adipamide | Comparative Example 1 Polyhexa- methylene- adipamide |
| --- | --- | --- |
| Breaking extension % | | |
| Warp | 39.2 | 39.6 |
| Weft | 37.7 | 29.7 |
| Tear propagation resistance N (trapeze method) | | |
| Warp | 247.2 | 251.0 |
| Weft | 244.3 | 224.6 |

This comparison with fabrics made polyamide-6.6 (polyhexamethyleneadipamide) yarns shows that by using polytetramethyleneadipamide yarns the fabric data hitherto known and required for airbag fabrics can be met in full. Thus, the better resistance to thermal failure possessed by airbag fabrics made of polytetramethyleneadipamide yarns may be achieved without impairing other properties.

OPERATIVE EXAMPLE 2

Example 1 was repeated using a 350 dtex 72 filament yarn, the filament linear density being accordingly 4.9 dtex. In accordance with the higher yarn linear density compared with Example 1, the nominal numbers of ends and picks per cm were both 25. The yarn used had a hot air shrinkage of 8.7% (measured at 190° C.). The treatment of the fabric was similar to that of Example 1.

The fabric thus produced had an air permeability of 5.7 $l/dm^2 \times min$ under a test differential pressure of 500 Pa.

OPERATIVE EXAMPLE 3

Example 1 was repeated using a 470 dtex 72 filament yarn, the filament linear density being accordingly 6.5 dtex. In accordance with the higher yarn linear density compared with Example 1, the nominal numbers of ends and picks per cm were both 22. The yarn used had a hot air shrinkage of 8.2% (measured at 190° C.). The treatment of the fabric was similar to that of Example 1.

The fabric thus produced had an air permeability of 7.4 $l/dm^2 \times min$ under a test differential pressure of 500 Pa.

OPERATIVE EXAMPLE 4

Example 1 was repeated using a 350 dtex 94 filament yarn, the filament linear density being accordingly 3.7 dtex. In accordance with the higher yarn linear density compared with Example 1, the nominal numbers of ends and picks per cm were both 25. The yarn used had a hot air shrinkage of 8.1% (measured at 190° C.). The treatment of the fabric was similar to that of Example 1.

The fabric thus produced had an air permeability of 4.6 $l/dm^2 \times min$ under a test differential pressure of 500 Pa.

OPERATIVE EXAMPLE 5

An airbag filter fabric, required to have a distinctly higher air permeability compared with airbag contact fabrics, was manufactured using a 470 dtex 572 filament yarn. To achieve the higher air permeability desired for filter fabrics, the yarn used had a hot air shrinkage of 3.2% (measured at 190° C.). Furthermore, compared with Example 3, where the manufacture of a contact fabric from a yarn of the same linear density is described, the nominal numbers of ends and picks per cm were both reduced to 16. The treatment of this fabric was likewise similar to that described in Example 1.

The fabric thus produced had an air permeability of 87 $l/dm^2 \times min$ under a test differential pressure of 500 Pa.

OPERATIVE EXAMPLE 6

A 470 dtex 72 filament polytetramethyleneadipamide yarn was woven in panama weave to form a fabric for side airbags. Nominal picks and ends were both 24.5/cm. The yarn used had a hot air shrinkage of 9.1% (measured at 190° C.). The fabric weight was 273 $g/m^2$. The wet treatment and the drying conditions were the same as in example No. 1. The air permeability of the fabric was 8.7 $l/dm^2.min$ under a test differential pressure of 500 Pa.

All the fabrics manufactured in Operative Examples 1–6 showed no signs of thermal stress when subjected to a function test at a fabric temperature of 85° C., unlike the fabric of Comparative Example 1 which exhibited rupture in the course of the test.

We claim:

1. An uncoated woven fabric of high thermal stability and protection against thermal failure useful for the production of an airbag comprising multifilament yarns of polytetramethyleneadipamide having an enthalpy in the range of from 720 to 820 Joules per gram, said yarns having a yarn linear density of 200–500 dtex, a filament linear density <7 dtex, a tenacity of at least 60 cN/tex and a breaking extension of 15–30%, and said uncoated woven fabric having an air permeability <20 $l/dm^2 \times min$.

2. An uncoated woven fabric of high thermal stability and protection against thermal failure useful for the production of a side airbag comprising multifilament yarn of polytetramethyleneadipamide having an enthalpy in the range of from 720 to 820 Joules per gram, said yarn having a yarn linear density of 200–750 dtex, a filament linear density <7 dtex, a tenacity of at least 60 cN/tex and a breaking extension of 15–30% and said uncoated woven fabric having an air permeability <20 $l/dm^2.min$.

3. The fabric of claim 2 produced by shrinking the fabric in an aqueous bath at a temperature of from 60° to 140° C.

4. The fabric of claim 1 wherein said air permeability is obtained by choice of a thread count dependent on the linear density of the yarn and by subjecting the fabric to a wet treatment in an aqueous bath at a temperature between 60° and 140°.

5. An airbag manufactured from the fabric of claim 1.

6. The fabric of claim 2 wherein the air permeability is <10 $l/dm^2.min$.

7. The fabric of claim 2 wherein the weight of said fabric is 220–320 $g/m^2$.

8. The fabric of claim 2 wherein the weight of said fabric is 240–290 $g/m^2$.

9. A side airbag manufactured from the fabric of claim 2.

* * * * *